(12) United States Patent
Lorenzi et al.

(10) Patent No.: US 11,483,372 B2
(45) Date of Patent: *Oct. 25, 2022

(54) ARTIFICIAL INTELLIGENCE BASED IMAGING SYSTEMS AND METHODS FOR INTERACTING WITH INDIVIDUALS VIA A WEB ENVIRONMENT

(71) Applicant: The Procter & Gamble Company, Cincinnati, OH (US)

(72) Inventors: Marc Paul Lorenzi, Singapore (SG); Zelun Sun, Singapore (SG)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,973

(22) Filed: Jul. 27, 2021

(65) Prior Publication Data
US 2021/0385266 A1 Dec. 9, 2021

Related U.S. Application Data

(63) Continuation of application No. 16/896,382, filed on Jun. 9, 2020, now Pat. No. 11,108,844.

(51) Int. Cl.
*H04L 67/02* (2022.01)
*G06F 16/957* (2019.01)
(Continued)

(52) U.S. Cl.
CPC .......... *H04L 67/02* (2013.01); *G06F 16/9577* (2019.01); *H04L 41/22* (2013.01);
(Continued)

(58) Field of Classification Search
CPC ... G06F 16/9577; H04L 41/22; H04L 69/329; H04L 67/01; H04L 67/02; H04L 67/53;
(Continued)

(56) References Cited

U.S. PATENT DOCUMENTS

| 8,799,756 B2 | 8/2014 | Grosz |
| 8,799,829 B2 | 8/2014 | Grosz |

(Continued)

FOREIGN PATENT DOCUMENTS

WO   2017046578 A1   3/2017

OTHER PUBLICATIONS

Hall, Adam, and Umakishore Ramachandran. "An execution model for serverless functions at the edge." Proceedings of the International Conference on Internet of Things Design and Implementation. (Year: 2019).*

(Continued)

*Primary Examiner* — John M MacIlwinen
(74) *Attorney, Agent, or Firm* — David M Weirich

(57) ABSTRACT

Artificial intelligence-based systems and methods are described for interacting with individuals via a web environment. A provisioning server is configured to receive a request from a web browser, executing on a client device, for a predefined imaging code stored in a memory of the provisioning server. The provisioning server responds to the request by transferring the predefined imaging code to the web browser. The predefined imaging code is configured to be executed by the client device to load, into a memory of the client device, one or more images of an individual; and determine, based on image analysis of the one or more images of the individual, one or more personal attributes of the individual.

25 Claims, 6 Drawing Sheets

(51) Int. Cl.
  *H04L 41/22* (2022.01)
  *H04L 69/329* (2022.01)
  *H04L 67/01* (2022.01)
  *G06Q 30/06* (2012.01)

(52) U.S. Cl.
  CPC ............ *H04L 67/01* (2022.05); *H04L 69/329* (2013.01); *G06Q 30/0631* (2013.01)

(58) Field of Classification Search
  CPC .. H04L 67/547; H04L 67/564; G06Q 30/0631
  See application file for complete search history.

(56) References Cited

U.S. PATENT DOCUMENTS

| | | |
|---|---|---|
| 8,923,551 B1 | 12/2014 | Grosz |
| 8,958,662 B1 | 2/2015 | Grosz |
| 8,990,672 B1 | 3/2015 | Grosz |
| 9,077,823 B1 | 7/2015 | Grosz |
| 9,219,830 B1 | 12/2015 | Ciorba |
| 9,329,762 B1 | 5/2016 | Schultz |
| 10,353,937 B2 | 7/2019 | Moeller-bertram |
| 10,452,868 B1 | 10/2019 | Sundberg |
| 10,504,020 B2 | 12/2019 | Trenholm |
| 2004/0003034 A1 | 1/2004 | Sun et al. |
| 2011/0314121 A1 | 12/2011 | Navda et al. |
| 2017/0270350 A1 | 9/2017 | Maltz et al. |
| 2018/0336641 A1 | 11/2018 | Dziabiak et al. |
| 2019/0250934 A1 | 8/2019 | Kim et al. |

OTHER PUBLICATIONS

Lonkar, Aishwarya, and Siddhesh Chandrayan. "The dark side of WebAssembly." Virus Bulletin. (Year: 2018).*
Malle, Bernd, et al. "The Need for Speed of AI Applications: Performance Comparison of Native vs. Browser-based Algorithm Implementations." arXiv preprint arXiv:1802.03707. (Year: 2018).*
Musch, Marius, et al. "New Kid on the Web: A Study on the Prevalence of WebAssembly in the Wild." International Conference on Detection of Intrusions and Malware, and Vulnerability Assessment. Springer, Cham. (Year: 2019).*
Zhao, Xin Wayne, et al. "We know what you want to buy: a demographic-based system for product recommendation on microblogs." Proceedings of the 20th ACM SIGKDD international conference on Knowledge discovery and data mining. (Year: 2014).*
Aponte, M.. Blazor Server vs. Blazor WebAssembly. In: Building Single Page Applications in .NET Core 3. Apress, Berkeley, CA. https://doi.org/10.1007/978-1-4842-5747-0_2. Jun. 6, 2020.*
Amirkhanov, Aleksandr et al. WithTeeth: Denture Preview in Augmented Reality. Vision, Modeling and Visualization. pp. 29-39. (Year: 2018).
Bonenberger, Yannic et al. Universal Web-Based Tracking for Augmented Reality Applications. In: Bourdot P., Cobb S., Interrantev V., kato H., Stricker D. (eds) Virtual Reality and Augmented Reality. EuroVR 2018. Lecture Notes in Computer Science, vol. 11162. (Year: 2018).
Hidaka, Masatoshi et al. WebDNN: Fastest DN N Execution Framework on Web Browser. In Proceedings of the 25th ACMx international conference on Multimedia (MM '17). Association for Computing Machinery, New York, NY, USA, 1213-1216. (Year:2017).
Pester et al. "Demonstration: Face Emotion Recognition (FER) with Deep Learning-Web Based Interface", Springer Nature 2019, LNNS 47, pp. 466-470, 2019.
Qiao, Xiuquan et al. "Web AR: A Promising Future for Mobile Augmented Reality-State of the Art, Challenges, and Insights," inProceedings of the IEEE, vol. 107, No. 4, pp. 651-666, Apr. 2019 (Year: 2019).
Reimers, "Machine Learning in the Browser", Harvard Library, senior thesis, published Mar. 2017, 31 pgs., http://nrs.harvard.edu/urn-3:HUL.InstRepos:38811507.
U.S. Unpublished U.S. Appl. No. 16/896,382, filed on Jun. 9, 2020 to first inventor et al.
All Office Actions, U.S. Appl. No. 16/896,382.
PCT Search Report and Written Opinion for PCT/US2021 /036305 dated Oct. 7, 2021,14 pages.
Anonymous: "Code caching for Web Assembly developers. V8",, Jun. 17, 2019 (Jun. 17, 2019), XP055845149,Retrieved from the Internet:URL:https://v8.dev/blog/wasm-code-caching[retrieved on Sep. 28, 2021), 6 pgs.
Yuan Ann: "Face and hand tracking in the browser with MediaPipe andTensorFlow.js", Mar. 9, 2020 (Mar. 9, 2020), XP055845113,Retrieved from the Internet:URL:https://blog.tensorflow.org/2020/03/face-and-hand-tracking-in-browserwith-mediapipe-and-tensorflowjs. html[retrieved on Sep. 28, 2021), 9 pgs.

* cited by examiner

ARTIFICIAL INTELLIGENCE BASED IMAGING SYSTEMS AND METHODS FOR INTERACTING WITH INDIVIDUALS VIA A WEB ENVIRONMENT

CROSS-REFERENCE TO RELATED APPLICATION

This application is a continuation of U.S. patent application Ser. No. 16/896,382, entitled "Artificial Intelligence Based Imaging Systems and Methods for Interacting with Individuals via a Web Environment," filed on Jun. 9, 2020, the disclosure of which is hereby incorporated herein by reference.

FIELD

The present disclosure generally relates to artificial intelligence-based imaging systems and methods, and more particularly to, artificial intelligence-based imaging systems and methods for interacting with individuals via a web environment.

BACKGROUND

Conventional web-based communication typically requires a web browser, or a native application (app) executing on a native operating system of a client device, to make multiple back-and-forth, round-trip communications with servers in order to operate. Such communications are typically required for client devices to offload complicated tasks, which can require extensive processing and memory resources, to the server because the server typically has more computing resources to handle such tasks when compared with those of conventional client devices. Such back-and-forth, round-trip communications, however, can create several problems related to performance and security. First, performance of a conventional web browser or native app is dependent on the speed, latency, and potential errors of the computer network through which it communicates, where a web browser or native app can fail to load or operate over a poor or compromised network or connection. In addition, a poor connection can cause a conventional web application to run at a reduced speed or capacity. This is especially so for software applications that transmit or use large sized files or information, such as image(s) or videos. For example, transfer of images can cause network delays because images and/or videos generally require high network bandwidth, and without it, delays and/or errors can be experienced at both the client and server sides. While some native apps can process images, such native apps are not desirable because they require at least two different operating systems for development and require checking for compatibility of multiple devices with varying hardware across multiple operating systems in order to operate effectively. For these reasons, native apps can be error prone, where a native app is not maintained, and can otherwise require constant versioning and maintenance, and must be checked and approved by a third-party platform distributor (e.g., the APPLE App store or GOOGLE Play store), that may require distribution fees. Moreover, consumers are increasingly unwilling to download non-essential native apps, which further decreases the desirability of such native apps.

Additional problems arise because conventional web-based communications are not secure. While security based protocols, such as Transport Layer Security (TLS) and secure sockets layer (SSL), can increase the security of web based communications, such protocols are not fail safe, and can be hacked or cracked, allowing a cyber-attacker to gain access to underlying information of intercepted web based communications. Such cyber-attacks are especially problematic for personal information (e.g., personal identifiable information (PII)) where users, and the companies which provide websites or servers with which users communicate, are typically extremely sensitive about protection and privacy of the personal information. This is especially so given that personal information is becoming increasingly important as it is subject to a growing body of privacy regulations.

For the foregoing reasons, there is a need for artificial intelligence-based imaging systems and methods for interacting with individuals via a web environment.

SUMMARY

Generally, the artificial intelligence-based imaging systems and methods for interacting with individuals via a web environment described herein provide a more secure environment for processing private information, such as PII. Generally, as referred to herein, PII is data that could potentially be used to identify a particular individual or person. Examples of PII include a full name, a Social Security number, a driver's license number, a bank account number, a passport number, and/or an email address of an individual. PII can also include an image of an individual. For example, such PII may include such as "selfie" images.

With the artificial intelligence-based imaging systems and methods described herein, private information need not be communicated over a computer network, and therefore, is not subject to interception by a cyber-attack. In particular, the disclosed systems and methods are able to operate without a need for constant connection to the internet, where only an initial connection or transmission (which does not necessarily involve the transfer of private information) is required to transfer a predefined imaging code to run on a client device. Any private information, such as PII, may be stored or processed locally on a user's client device by the predefined imaging code. In addition, the disclosed artificial intelligence-based imaging systems and methods provide more powerful functionality by providing artificial intelligence image analysis to enhance, annotate, or otherwise perform image analysis on images (e.g., selfies) for making user and/or product recommendations specific to the user.

More specifically, as described herein, an artificial intelligence-based imaging system is configured to interact with individuals via a web environment. The artificial intelligence-based imaging system comprises a provisioning server comprising one or more processors and one or more memories. The provisioning server may be configured to respond to requests from a web browser executing on a client device. In addition, a predefined imaging code may be stored in the one or more memories of the server. Computing instructions may be configured to execute on the one or more processors of the provisioning server. The computing instructions may cause the provisioning server, upon receiving a request from the web browser, to transfer the predefined imaging code to the web browser for execution by a client processor of the client device. The predefined imaging code may be configured, upon execution by the client processor, to load, into a memory of the client device, one or more images of an individual; and determine, based on image analysis of the one or more images of the individual, one or more personal attributes of the individual. Additionally or alternatively, in some embodiments, the predefined imaging code is executable within the web browser without communication with the provisioning server.

In addition, as described herein, an artificial intelligence-based imaging method is disclosed for interacting with individuals via a web environment. The artificial intelligence-based imaging method comprises receiving, at a provisioning server, a request from a web browser for a predefined imaging code, the provisioning server having access to a memory storing the predefined imaging code. The intelligence-based imaging method further comprises responding, by the provisioning server, to the request by transferring the predefined imaging code to the web browser for execution by a client processor of a client device. The web browser may execute on the client device. The artificial intelligence-based imaging method may further comprise loading, with the predefined imaging code into a memory of the client device, one or more images of an individual. The artificial intelligence-based imaging method may further comprise determining, with the predefined imaging code based on image analysis of the one or more images of the individual, one or more personal attributes of the individual. Additionally, or alternatively, in some embodiments the predefined imaging code may be executable within the web browser without communication with the provisioning server.

In addition, as described herein, an artificial intelligence-based imaging system is configured to interact with individuals via a web environment. The artificial intelligence-based imaging system comprises a provisioning server comprising one or more processors and one or more memories. The provisioning server may be configured to respond to requests from a web browser executing on a client device. In addition, the predefined imaging code may be configured to be stored in the one or more memories of the server. Still further, computing instructions may be configured to execute on the one or more processors of the provisioning server. The computing instructions may cause the provisioning server, upon receiving a request from the web browser, to transfer the predefined imaging code to the web browser for execution by a client processor of the client device. The predefined imaging code may be configured, upon execution by the client processor, to load, into a memory of the client device, one or more images of an individual; and determine, based on image analysis of the one or more images of the individual, one or more personal attributes of the individual. Additionally or alternatively, in some embodiments, the predefined imaging code may be executable within the web browser without communication with the provisioning server. Additionally or alternatively, in some embodiments, one or more personal attributes may comprise one or more facial features, one or more oral features, or one or more hair-based features of the individual.

Further, as described herein, an artificial intelligence-based imaging method is disclosed for interacting with individuals via a web environment. The artificial intelligence-based imaging method comprises receiving, at a provisioning server, a request from a web browser for a predefined imaging code, the provisioning server having access to a memory storing the predefined imaging code. The intelligence-based imaging method further comprises responding, by the provisioning server, to the request by transferring the predefined imaging code to the web browser for execution by a client processor of a client device. The web browser may execute on the client device. The artificial intelligence-based imaging method may further comprise loading, with the predefined imaging code into a memory of the client device, one or more images of an individual. The artificial intelligence-based imaging method may further comprise determining, with the predefined imaging code based on image analysis of the one or more images of the individual, one or more personal attributes of the individual. Additionally or alternatively, in some embodiments, the predefined imaging code may be executable within the web browser without communication with the provisioning server. Additionally or alternatively, in some embodiments, the one or more personal attributes may comprise one or more facial features, one or more oral features, or one or more hair-based features of the individual.

Moreover, in some embodiments, the predefined imaging code described above may be configured to be stored in a memory of the client device by the web browser when the predefined imaging code is received by the web browser. Additionally or alternatively, in some embodiments, the predefined imaging code may be configured to be executed by the client processor of the client device upon the predefined imaging code being received by the web browser. Additionally or alternatively, in some embodiments, the predefined imaging code may be configured, upon execution by the client processor to render an interactive graphical user interface (GUI) within the web browser on a display of the client device; and render the one or more personal attributes of the individual within the interactive GUI. Additionally or alternatively, in some embodiments, the predefined imaging code may be cached in the memory of the client device, and the predefined imaging code may be allowed to access at least a portion of the memory as allocated for the web browser.

In accordance with the above, and with the disclosure herein, the present disclosure includes improvements in computer functionality or in improvements to other technologies at least because the disclosure describes that, e.g., a client device is improved where the security of the client device is enhanced by the use of predefined imaging code. The predefined imaging code, once received and executed by the client device, is self-sufficient and does not transmit private or personal information of a user over a public network (e.g., the Internet). This prevents such information from being intercepted by cyber-attackers. That is, the present disclosure describes improvements in the functioning of the computer itself or "any other technology or technical field" because the data is secure as it does not need to be sent through networks with inherent security vulnerabilities. This improves over the prior art at least because conventional web communications are prone to security issues/cyber-attacks because such web communications may be intercepted and cracked, even if sent by secure protocol standards such as SSL and/or TLS.

In addition, the present disclosure includes improvements in computer functionality or in improvements to other technologies at least because the disclosure describes that, e.g., a client device can provide, through use of the predefined imaging code, higher resolution imaging analysis by executing on the client device alone or at least in large part. These advantages can be particularly important for apps where images and other personal information is necessary for the app to work and where the app uses large files (e.g. images) and requires sophisticated processing. Faster data processing is achieved because, with the use of the predefined imaging code, the client device no longer experiences lag from typical network communications, especially via transmission of large files or data, e.g., image data. Instead, with the predefined imaging code, a client device has no need for permanent internet connection. In various embodiments, after transmitted and loaded (e.g., once before every use), the predefined imaging code can then operate with no or little data connection to a server.

In addition, the present disclosure includes specific features other than what is well-understood, routine, conventional activity in the field, or adding unconventional steps that confine the claim to a particular useful application, e.g., artificial intelligence-based imaging systems and methods for interacting with individuals via a web environment as described herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION OF THE INVENTION

Figure 1:
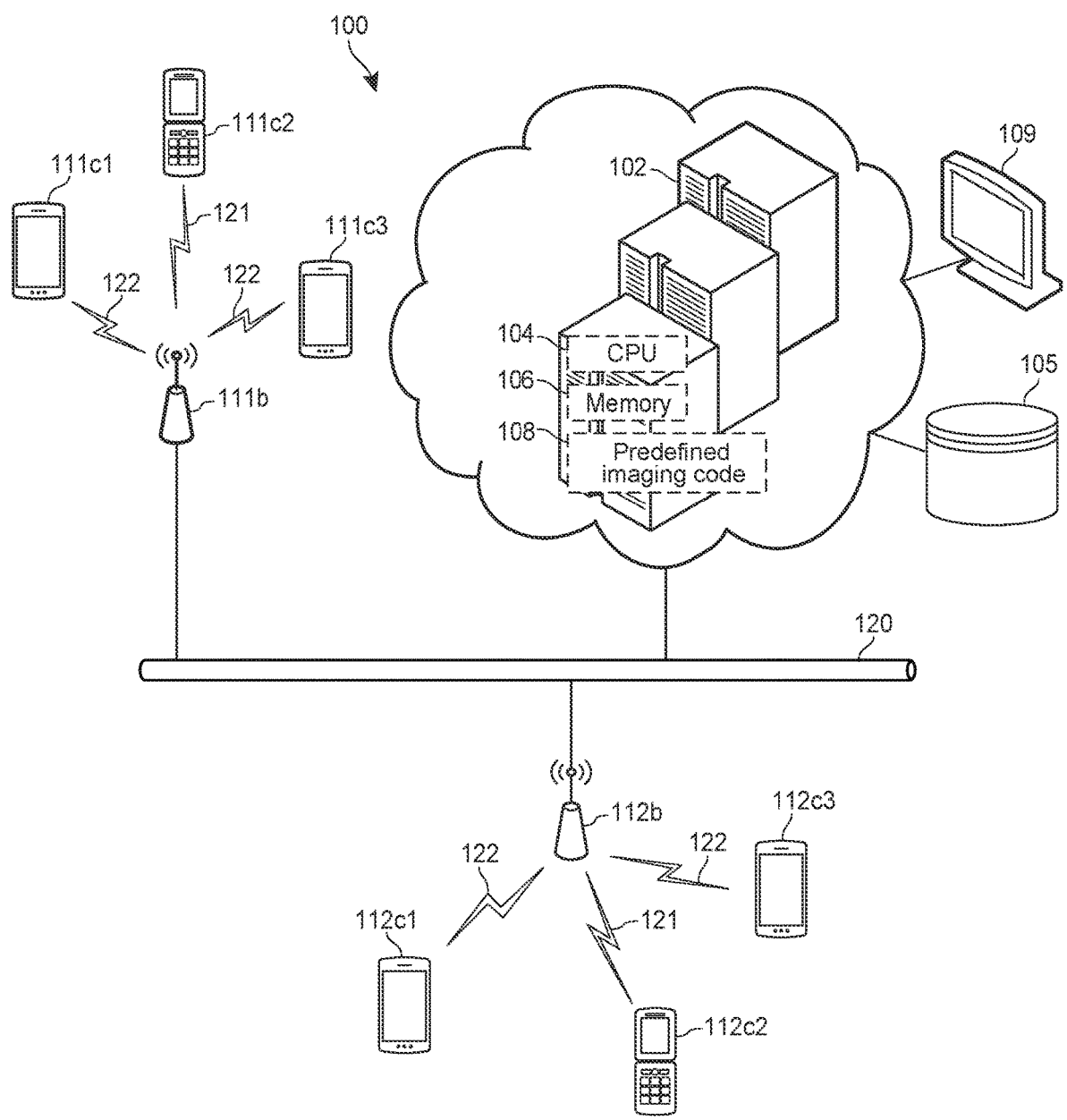
FIG. 1 illustrates an example artificial intelligence-based imaging system configured to interact with individuals via a web environment in accordance with various embodiments disclosed herein.

FIG. 1 illustrates an example artificial intelligence-based imaging system 100 configured to interact with individuals via a web environment in accordance with various embodiments disclosed herein. In the example embodiment of FIG. 1, artificial intelligence-based imaging system 100 includes server(s) 102, which may comprise one or more computer servers. In various embodiments server(s) 102 comprise multiple servers, which may comprise a multiple, redundant, or replicated servers as part of a server farm. In still further embodiments, server(s) 102 may be implemented as cloud-based servers. For example, server(s) 102 may be any one or more cloud-based platform(s) such as MICROSOFT AZURE, AMAZON AWS, or the like. Server(s) 102 may include one or more processor(s) 104 as well as one or more computer memories 106. Server(s) 102 may be referred to herein as "provisioning server(s)."

The memories 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memorie(s) 106 may store an operating system (OS) (e.g., Microsoft Windows, Linux, Unix, etc.) capable of facilitating the functionalities, apps, methods, or other software as discussed herein. The memorie(s) 106 may also store a predefined imaging code 108 for transmission or transfer to web browsers or client devices as described herein. Additionally, or alternatively, the predefined imaging code 108 may also be stored in database 105, which is accessible or otherwise communicatively coupled to server(s) 102. The memories 106 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, an imaging based machine learning model or component, and/or the predefined imaging code 108, where each are configured to facilitate their various functionalities discussed herein. It should be appreciated that one or more other applications may be envisioned and that are executed by the processor(s) 104.

The processor(s) 104 may be connected to the memories 106 via a computer bus responsible for transmitting electronic data, data packets, or otherwise electronic signals to and from the processor(s) 104 and memories 106 in order to implement or perform the machine readable instructions, methods, processes, elements or limitations, as illustrated, depicted, or described for the various flowcharts, illustrations, diagrams, figures, and/or other disclosure herein.

The processor(s) 104 may interface with the memory 106 via the computer bus to execute the operating system (OS).

The processor(s) 104 may also interface with the memory 106 via the computer bus to create, read, update, delete, or otherwise access or interact with the data stored in the memories 106 and/or the database 104 (e.g., a relational database, such as Oracle, DB2, MySQL, or a NoSQL based database, such as MongoDB). The data stored in the memories 106 and/or the database 104 may include all or part of any of the data or information described herein, including, for example, the one or more search requests, the one or more transaction details, and the profile information of the user.

The server(s) 102 may further include a communication component configured to communicate (e.g., send and receive) data via one or more external/network port(s) to one or more networks or local terminals, such as computer network 120 and/or terminal 109 (for rendering or visualizing) described herein. In some embodiments, server(s) 102 may include a client-server platform technology such as ASP.NET, Java J2EE, Ruby on Rails, Node.js, a web service or online API, responsive for receiving and responding to electronic requests. The server(s) 102 may implement the client-server platform technology that may interact, via the computer bus, with the memories(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein. According to some embodiments, the server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some embodiments, computer network 120 may comprise a private network or local area network (LAN). Additionally, or alternatively, computer network 120 may comprise a public network such as the Internet.

Server(s) 102 may further include or implement an operator interface configured to present information to an administrator or operator and/or receive inputs from the administrator or operator. As shown in FIG. 1, an operator interface may provide a display screen (e.g., via terminal 109). Server(s) 102 may also provide I/O components (e.g., ports, capacitive or resistive touch sensitive input panels, keys, buttons, lights, LEDs), which may be directly accessible via or attached to server(s) 102 or may be indirectly accessible via or attached to terminal 109. According to some embodiments, an administrator or operator may access the server 102 via terminal 109 to review information, make changes, input training data, and/or perform other functions.

As described above herein, in some embodiments, server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the predefined imaging code or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 1, server(s) 102 are communicatively connected, via computer network 120 to the one or more client devices 111c1-111c3 and/or 112c1-112c3 via base stations 111b and 112b. In some embodiments, base stations 111b and 112b may comprise cellular base stations, such as cell towers, communicating to the one or more client devices 111c1-111c3 and 112c1-112c3 via wireless communications 121 based on any one or more of various mobile phone standards, including NMT, GSM, CDMA, UMMTS, LTE, 5G, or the like. Additionally or alternatively, base stations 111b and 112b may comprise routers, wireless switches, or other such wireless connection points communicating to the one or more client devices 111c1-111c3 and 112c1-112c3 via wireless communications 122 based on any one or more of various wireless standards, including by non-limiting example, IEEE 802.11a/b/c/g, the BLUETOOTH standard, or the like.

Any of the one or more client devices 111c1-111c3 and/or 112c1-112c3 may comprise a cellular phone, a mobile phone, a tablet device, a personal data assistance (PDA), or the like, including, by non-limiting example, an APPLE iPhone or iPad device or a GOOGLE ANDROID based mobile phone or table. In addition, the one or more client devices 111c1-111c3 and/or 112c1-112c3 may implement or execute an operating system (OS) or mobile platform such as Apple's iOS and/or Google's Android operation system. Any of the one or more client devices 111c1-111c3 and/or 112c1-112c3 may comprise one or more processors and/or one or more memories for storing, implementing, or executing computing instructions or code (e.g., the predefined imaging code) as described in various embodiments herein.

Figure 2:
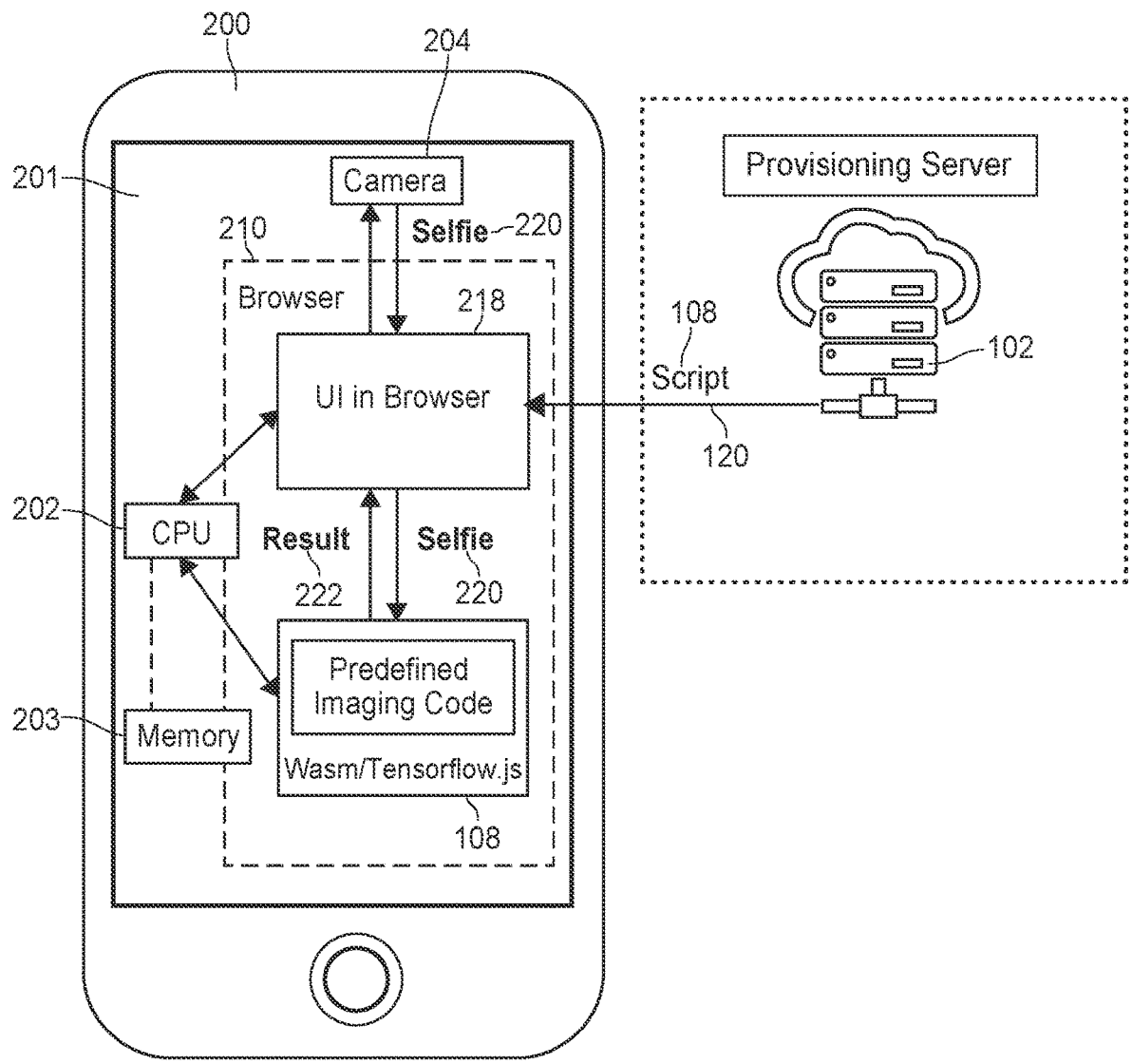
FIG. 2 illustrates a diagram of an example client device implementing predefined imaging code as received from a provisioning server of the artificial intelligence-based imaging system of FIG. 1 in accordance with various embodiments disclosed herein.

FIG. 2 illustrates a diagram of an example client device 200 implementing predefined imaging code 108 as received from a provisioning server 102 of the artificial intelligence-based imaging system 100 of FIG. 1 in accordance with various embodiments disclosed herein. Client device 200 could be any of the client devices 111c1-111c3 and/or 112c1-112c3 as described herein for FIG. 1. In FIG. 2, client device 200 is illustrated as a mobile phone, e.g., such as an Apple iPhone device or a Google Android device. However, it is to be understood that client device 200 could be a tablet, PDA, or other such similar client device, for example, as described herein.

In the example of FIG. 2, Client device 200 includes a CPU 202 (e.g., a processor) and a camera 204. Camera 204 is configured to take, capture, or otherwise generate digital images (e.g., pixel-based images) and, at least in some embodiments, may store such images in a memory 203 of client device 200. Memory 203 is communicatively coupled to or accessible by CPU 202. The CPU 202 may implement or execute computing instructions, including instructions to implement web browser 210 on a display screen 201 of client device 200. In various embodiments, web browser 210 may be implemented as a mobile application (app) or native app for the given operating system of client device 200. Use of web browser 210 provides very wide distribution and/or availability of the artificial intelligence-based imaging systems and methods to drive traffic and use of the artificial intelligence-based imaging systems and methods describe herein. That is, web browser 210 allows implementation and execution of the artificial intelligence-based imaging systems and methods regardless of operating system or client device model, e.g., client device 200.

Client device 200 may comprise a wireless transceiver to receive wireless communications 121 and/or 122 from base stations 111*b* and/or 112*b*, as described herein. In various embodiments described herein, client device 200 and/or web browser 210 may implement or execute instructions to request predefined imaging code 108 from provisioning server 102. For example, as shown for FIG. 2, in some embodiments, predefined imaging code 108 may be transferred to client device 200 and/or web browser 210 as a script, such as, by non-limiting example, a JavaScript (.js) file, a web assembly module (WASM), and/or the like. In various embodiments, predefined imaging code 108 may be stored or cached in memory 203 of client device 200. In some embodiments, predefined imaging code 108 may further comprise, implement, have access to, render, or otherwise expose, at least in part, graphical user interface (GUI) 218 for displaying text and/or images on display screen 201. Additionally, or alternatively, web browser 210 may comprise, implement, have access to, render, or otherwise expose, at least in part, GUI 218 for displaying text and/or images on display screen 201.

The predefined imaging code 108 provides imaging analysis and/or imaging algorithms on digital images captured by camera 204. For example, in various embodiments, such imaging analysis and/or imaging algorithms may be implemented by predefined or compiled code of predefined imaging code 108. Such code may include, but is not limited to, web assembly (WASM). Generally, WASM is a portable binary-code format for generation of executable programs that can be executed or implemented in a host environment such as a web browser (e.g., web browser 210). Because the WASM is an executable program, it provides high performance within the web browsers compared to traditional browser-based technologies, including, for example, stand-alone JavaScript and cascading style sheets (CSS). Additionally, or alternatively, predefined imaging code 108 may also comprise scripts or code, such as code from third-party libraries such as the TENSORFLOW library (e.g., Tensorflow.js). For example, the TENSORFLOW library provides predefined imaging code 108 with artificial intelligence algorithms for analyzing the digital images as described herein. Additionally, or alternatively, predefined imaging code 108 includes proprietary JavaScript and/CSS that loads, caches, or otherwise interacts with WASM code and/or third party code (e.g., TENSORFLOW). In various embodiments, predefined imaging code 108 includes each of one or more of WASM and JavaScript code (e.g., Tensorflow.js and/or proprietary JavaScript) for implementing the methods, flowcharts, algorithms, or portions thereof, as described herein.

As shown in FIG. 2, in various embodiments, a camera 204 is may be used (e.g., as requested from GUI 218) to capture digital images, such as "selfie" 220, e.g., a self-taken picture. It is to be understood that while selfies are described for FIG. 2, other digital images are contemplated herein (e.g., pictures taken by persons other than the target individual). In some embodiments, as shown for FIG. 2, "selfie" 220 may be optionally displayed via GUI 218. Additionally, or alternatively, "selfie" 220 may be provided to predefined imaging code 108 for imaging analysis which may include, as described herein, determining, based on image analysis of one or more images of an individual, one or more personal attributes of the individual. Additionally, this may further include rendering the one or more personal attributes of the individual within an interactive GUI on or as part of GUI 218. Result 222 (e.g., any of the one or more personal attributes) of such imaging analysis may be displayed on GUI 218. In this way, artificial intelligence-based imaging system 100 is configured to interact with individuals via a web environment. It is to be noted that, as shown by FIG. 2, none of the digital images captured and analyzed, are transmitted over any network (e.g., computer network 120) to server(s). In this way PII (e.g., the selfie of the individual) is not at risk of being intercepted on a computer network, and, as a result, increases the security of the artificial intelligence-based imaging system 100 and the client device 200 as a whole.

Figure 3:
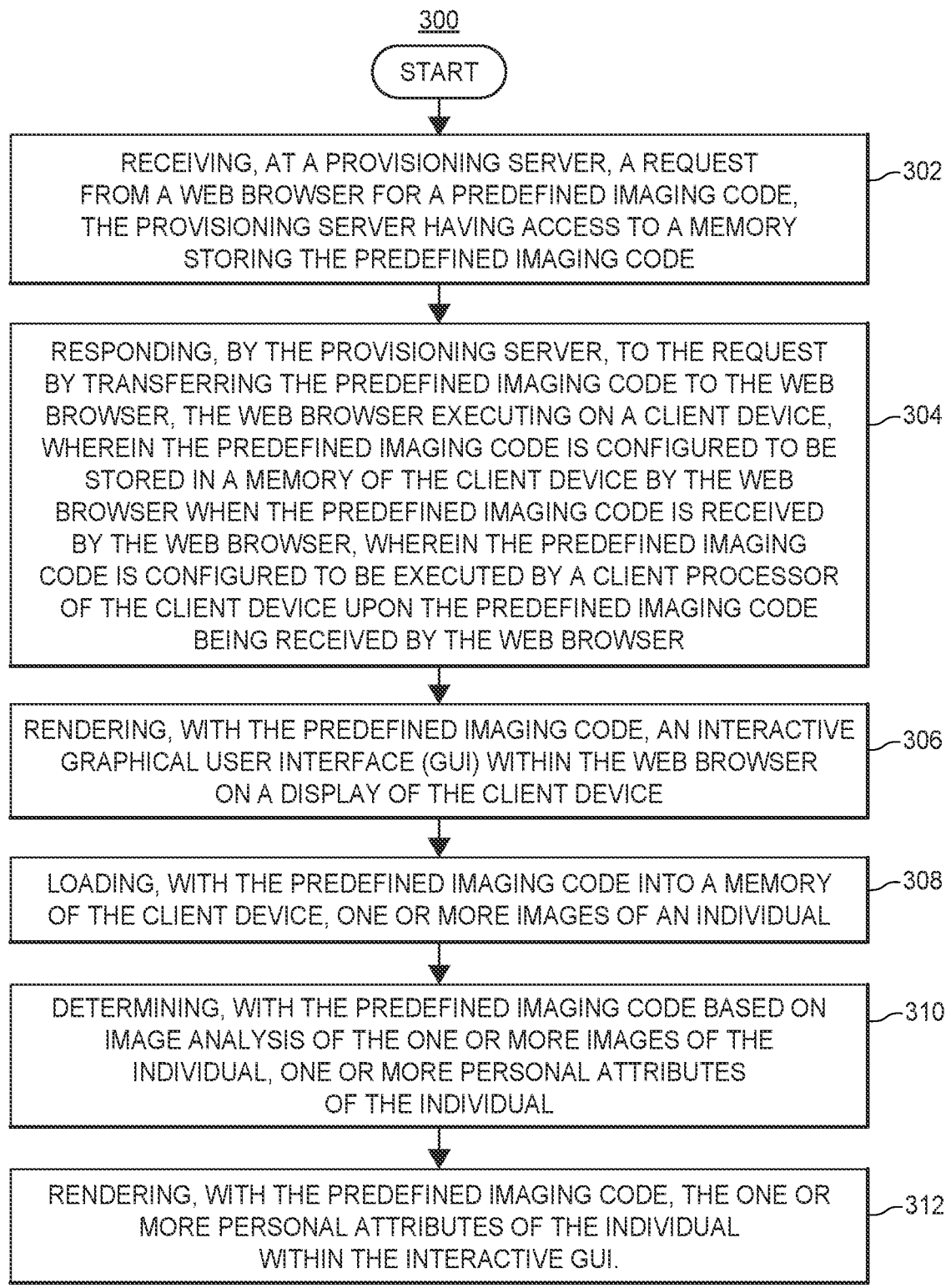
FIG. 3 illustrates a diagram of an example artificial intelligence-based imaging method for interacting with individuals via a web environment in accordance with various embodiments disclosed herein.

FIG. 3 illustrates a diagram of an example artificial intelligence-based imaging method 300 for interacting with individuals via a web environment in accordance with various embodiments disclosed herein. At block 302 artificial intelligence-based imaging method 300 comprises receiving, at a provisioning server (e.g., provisioning server(s) 102), a request (e.g., a hypertext transfer (HTTP) request) from a web browser (e.g., web browser 210) for a predefined imaging code (e.g., predefined imaging code 108). As described herein, the provisioning server (e.g., provisioning server(s) 102) has access to a memory (e.g., database 105 and/or memorie(s) 106) storing the predefined imaging code.

At block 304 artificial intelligence-based imaging method 300 further comprises responding, by the provisioning server (e.g., provisioning server(s) 102), to the request by transferring the predefined imaging code (e.g., predefined imaging code 108) to the web browser (e.g., web browser 210), where the web browser is executing on a client device (e.g., client device 200). In various embodiments, web browser 210 is configured to receive hypertext markup language (HTML) from provisioning servers 102 for use in rendering at least a portion of a user interface (e.g., GUI 218) or display of web browser 210.

In various embodiments, predefined imaging code 108 is configured to be stored in a memory (e.g., memory 203) of the client device (e.g., client device 200) by the web browser (e.g., web browser 210), for example, when predefined imaging code 108 is received by the web browser. Additionally or alternatively, in various embodiments, predefined imaging code 108 is configured to be executed by a client processor (e.g., CPU 202) of the client device (e.g., client device 200) upon predefined imaging code 108 being received by web browser 210.

At block 306 artificial intelligence-based imaging method 300 further comprises rendering, with predefined imaging code 108, an interactive graphical user interface (e.g., GUI 218) within the web browser (e.g., web browser 210) on a display (e.g., display screen 201) of the client device (e.g., client device 200).

At block 308 artificial intelligence-based imaging method 300 further comprises loading, with the predefined imaging code (e.g., predefined imaging code 108) into a memory (e.g., memory 203) of the client device, one or more images (e.g., as captured by camera 204) of an individual.

At block 310 artificial intelligence-based imaging method 300 further comprises determining, with the predefined imaging code (e.g., predefined imaging code 108) based on image analysis of the one or more images of the individual, one or more personal attributes of the individual. In various embodiments, the image analysis comprises training and/or using a machine learning model, neural network, or other artificial intelligence model, based on pixel data of the one or more images of the individual, to determine the one or more personal attributes of the individual. For example, in various embodiments, a machine learning imaging model, as described herein, may be trained using a supervised or unsupervised machine learning program or algorithm. The machine learning program or algorithm may employ a neural network, which may be a convolutional neural network, a deep learning neural network, or a combined learning module or program that learns in two or more features or feature datasets in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. Machine learning may involve identifying and recognizing patterns in existing data (such as training a model based on pixel data within images having a plurality of personal attributes of individuals) in order to facilitate making predictions or identification for subsequent data (such as using the model on new pixel data of a new individual in order to determine new one or more personal attributes of such new individual).

Machine learning model(s), such as those of a machine learning imaging model described herein, may be created and trained based upon example (e.g., "training data,") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

Image analysis may include training a machine learning imaging model based on pixel data of images of one or more individuals. Additionally, or alternatively, image analysis may include using a machine learning imaging model, as previously trained, to determine, based on the one or more images of the individual, one or more personal attributes of the individual. In this way, pixel data (e.g., detailing one or more features of an individual, such as a mouth, hairline, face or portion(s) thereof) may be used to train or use a machine learning imaging model to determine one or more personal attributes of the individual. Such personal attributes may include, but are not limited to a facial feature (e.g., a skin or facial hair feature), an oral, e.g., tooth or teeth related need (e.g., plaque, coloring, or other oral issue), or a hair-based feature (e.g., hair length, hair coloring, etc.) features of the individual.

In some embodiments, predefined imaging code 108, as transmitted to client device 200, comprises a web assembly (WASM) based module and one or more scripts (e.g., JavaScript code). In various embodiment, a WASM based module comprises a machine learning imaging model (as described herein). The machine learning imaging model is configured to input one or more images of an individual and determine the personal attributes of the individual as described herein. In some embodiments, the one or more scripts or, more generally, predefined imaging code 108 may comprise a machine learning imaging model, where the machine learning imaging model implements or uses at least a TENSORFLOW based library. Additionally, or alternatively, machine learning imaging model may comprise, implement, or otherwise use other artificial intelligence-based third-party package or libraries including the PYTORCH library or the SCIKIT-LEARN Python library.

Referring to FIG. 3, at block 312 artificial intelligence-based imaging method 300 further comprises rendering, with the predefined imaging code (e.g., predefined imaging code 108), the one or more personal attributes of the individual within the interactive GUI (e.g., GUI 218). In various embodiments, predefined imaging code 108 is further configured, upon execution by the client processor (e.g., CPU 202), to render the one or more images with the one or more personal attributes of the individual within an interactive GUI (e.g., GUI 218).

In various embodiments, predefined imaging code 108 is executable within the web browser (e.g., web browser 210) without communication with the provisioning server (e.g., provisioning server(s) 102). In some embodiments, predefined imaging code 108 may be transferred during a single transmission from a provisioning server (e.g., provisioning server(s) 102) to the web browser (e.g., web browser 210). Additionally, or alternatively, predefined imaging code is executable within a web browser (e.g., web browser 210) without sending personally identifiable information (PII) to the provisioning server (e.g., provisioning server(s) 102).

In various embodiments predefined imaging code 108 is cached in the memory (e.g., memory 203) of the client device (e.g., client device 200), where the predefined imaging code 108 is allowed to access at least a portion of the memory (e.g., memory 203) as allocated for the web browser (e.g., web browser 210). Additionally, or alternatively, the predefined imaging code 108 is allowed to access at least a portion of the memory (e.g., memory 203) as not allocated for the web browser (e.g., web browser 210), or that is otherwise separate from the memory allocated for the web browser. In some embodiments, at least a portion of predefined imaging code 108 is cached in the memory (e.g., memory 203) of the client device (e.g., client device 200) before or during capture of the one or more images of the individual.

Figure 4:
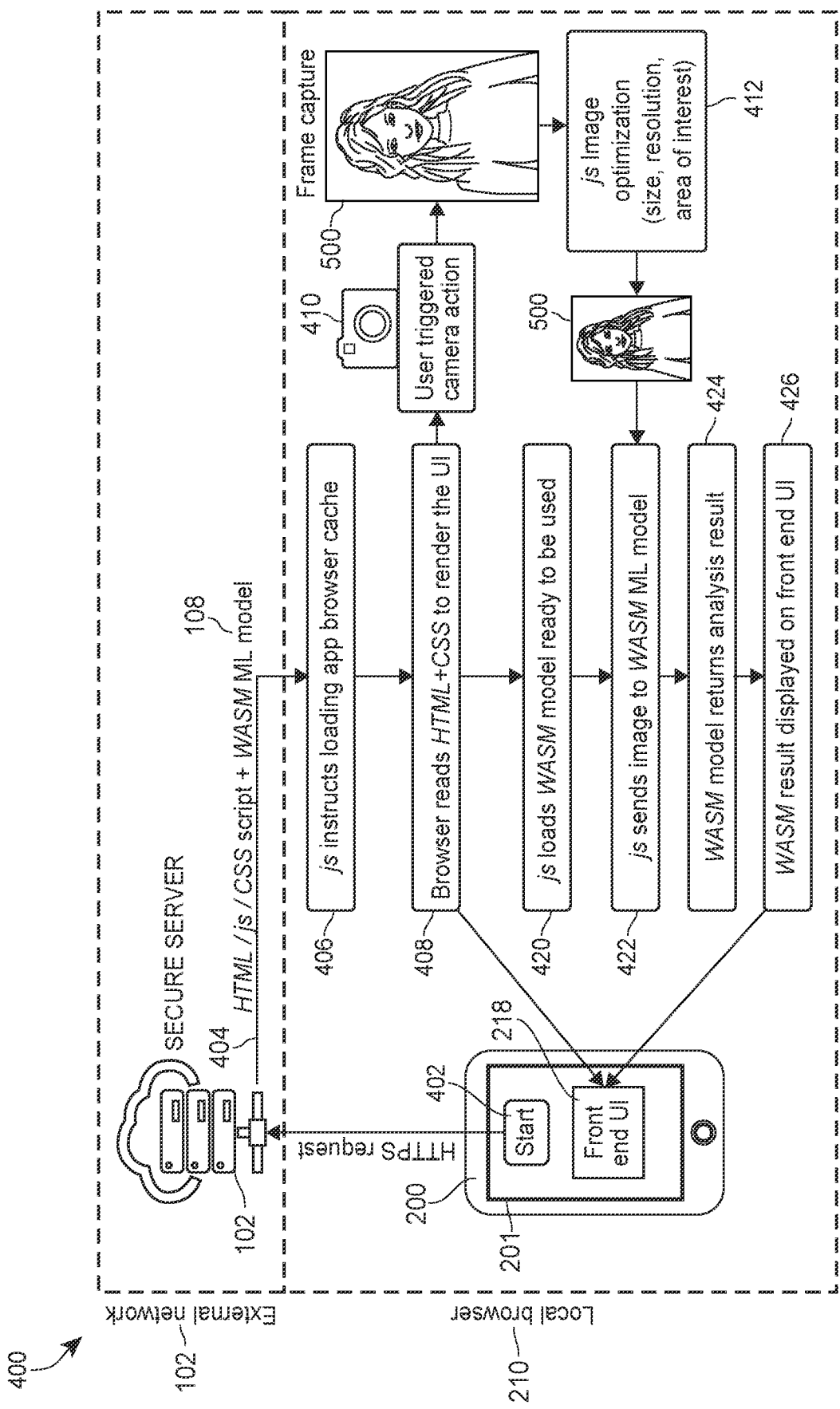
FIG. 4 illustrates a diagram of a further example artificial intelligence-based imaging method for interacting with individuals via a web environment in accordance with the method of FIG. 3, and in accordance with various embodiments disclosed herein, and where one or more personal attributes of an individual comprise one or more facial features, one or more oral features, or one or more hair-based features of the individual.

FIG. 4 illustrates a diagram of a further example artificial intelligence-based imaging method 400 for interacting with individuals via a web environment in accordance with method 300 of FIG. 3, and in accordance with various embodiments disclosed herein, and where one or more personal attributes of an individual comprise one or more facial features, one or more oral features, or one or more hair-based features of the individual.

Figure 5:
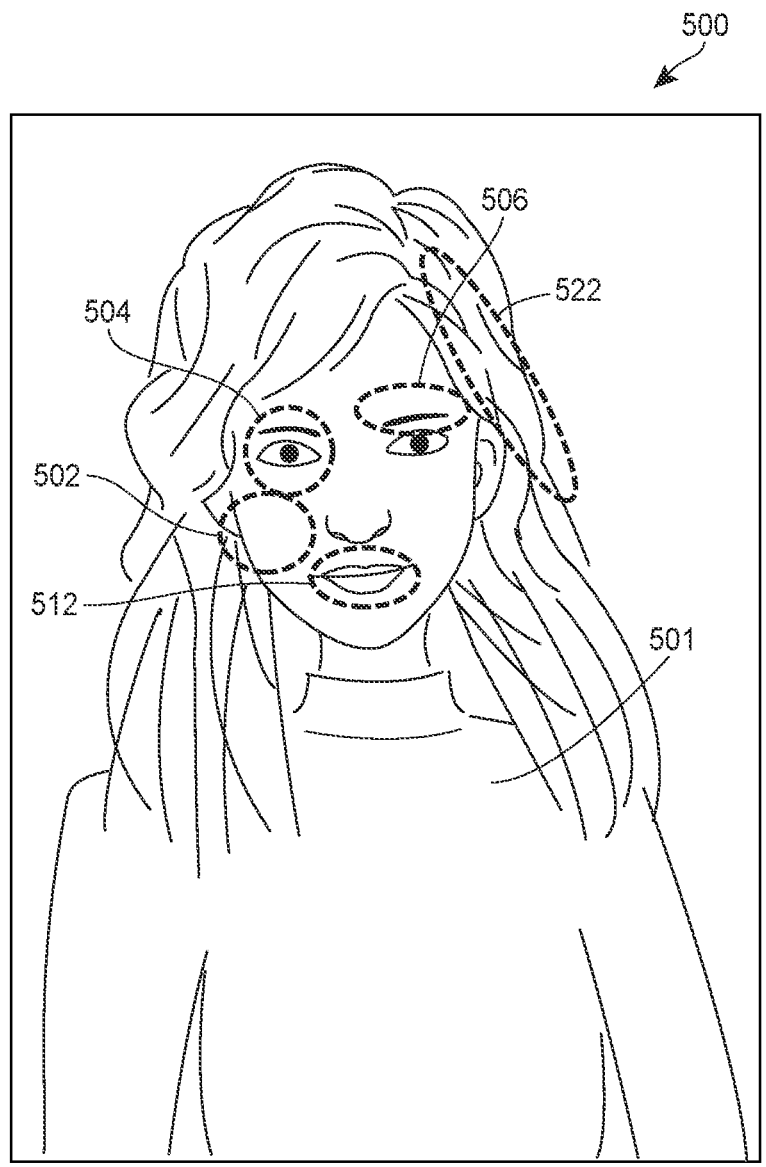
FIG. 5 illustrates an example image of any of the artificial intelligence-based imaging systems or methods as described for FIGS. 1-4, comprising an individual showing one or more personal attributes of the individual comprising one or more facial features, one or more oral features, or one or more hair-based features of the individual, in accordance with various embodiments disclosed herein.

Method 400 of FIG. 4 describes image analysis of an example image 500 of FIG. 5. More generally, FIG. 5 illustrates image 500 for image analysis by any of the artificial intelligence-based imaging systems or methods as described for FIGS. 1-4, respectively, of an individual 501 showing one or more personal attributes 502-522 of individual 501 comprising one or more facial features (e.g., skin 502, eye 504, eyebrow 506, lips 512), one or more oral features (e.g., teeth or through (not shown)), or one or more hair-based features (e.g., hair 522) of individual 501, in accordance with various embodiments disclosed herein. As illustrated by FIG. 5, image 500 comprises pixel data corresponding to each of the personal attributes 502-522, and their respective areas and/or locations within image 500 of individual 501. The pixel data of any of the one or more personal attributes 502-522 may be captured by camera 204 and analyzed by predefined imaging code 108, including, for example, by machine learning imaging model(s), e.g., WASM module, as described herein.

With reference to FIG. 4, at block 402 method 400 comprises client device 200 sending, to a provisioning server (e.g., provisioning servers 102), a request from a web browser (e.g., web browser 210) for a predefined imaging code (e.g., predefined imaging code 108). Provisioning server may access a memory (e.g., database 105 and/or memorie(s) 106) storing predefined imaging code 108. In various embodiments, the request may be made from a link within a web page, such as an initial or preload webpage that requests software, code, instructions, or other such assets (e.g., predefined imaging code 108) to allow artificial intelligence-based imaging analysis as described herein. Additionally, or alternatively, the request may be made from a predefined link, e.g., such as a link or address stored in memory 203 of client device 200.

At block 404 method 400 further comprises the provisioning server (e.g., provisioning server(s) 102) responding to the request by transferring predefined imaging code 108 to the web browser (e.g., web browser 210 executing on a client device 200). As illustrated by non-limiting example for FIG. 4, a response from provisioning server(s) includes software, code, and/or instructions comprising hyper-text markup language (HTML), JavaScript (js), cascading style sheet (CSS) script, and WASM code (e.g., the WASM code comprising the machine learning ML model for performing imaging analysis of image 500 and/or other images of the individual). For example, predefined imaging code 108 can comprise such software, code, and/or instructions, as transferred in block 406, in whole or in part. For example, predefined imaging code 108 may comprise WASM code comprising a machine learning (ML) model but where the remaining portion of the response from provisioning server(s) 102 may comprise JavaScript, such as proprietary code or third party code (e.g., TensorFlow.js), and/or HTML and CSS for use by web browser 210 to format, arrange, or generate an front end UI (e.g., UI 218) on display screen 201 of client device 200. For example, in various embodiments, web browser 210 is configured to receive hypertext markup language (HTML) from provisioning servers 102 for use in rendering at least a portion of a user interface (e.g., GUI 218) or display of web browser 210.

In various embodiments, predefined imaging code 108 is executable within the web browser (e.g., web browser 210) without communication with the provisioning server (e.g., provisioning server(s) 102). In some embodiments, predefined imaging code 108 may be transferred during a single transmission from a provisioning server (e.g., provisioning server(s) 102) to the web browser (e.g., web browser 210). Additionally, or alternatively, predefined imaging code is executable within a web browser (e.g., web browser 210) without sending personally identifiable information (PII) to the provisioning server (e.g., provisioning server(s) 102). In this way, WASM code may interact with the web browser 210, including via HTML, JavaScript, or otherwise, to update web browser 210 without needing to request processing or information from provisioning server(s) 102. Such interaction may include interacting with the document object model (DOM) of a webpage of web browser 210, for example, causing text and/or images, e.g., e.g., image 500 and related text, to be displayed via GUI 218 of web browser 210.

At block 406, method 400 further comprises loading or storing predefined imaging code 108 into cache or memory (e.g., memory 203) of, used by, or at least shared by web browser 210. In various embodiments, predefined imaging code 108 is configured to be executed by a client processor (e.g., CPU 202) of a client device (e.g., client device 200) upon the predefined imaging code 108 being received by the web browser (e.g., web browser 210). For example, as shown in FIG. 4, a JavaScript file (e.g., that received by provisioning server(s) 102) may instruct web browser 210 and/or client device 200 to store predefined imaging code 108 in memory 203 of client device 200 when predefined imaging code 108 is received by the web browser 210.

At block 408, method 400 further comprises web browser 210 reading HTML and CSS scripts, code, and/or instructions, such as those as received by provisioning server(s) 102, to render GUI 218. That is, web browser 210 execution on client device 200 may render, with predefined imaging code 108 and/or HTML, JavaScript, CSS, or other instructions received by provisioning server(s) 102, a GUI (e.g., GUI 218) within web browser 210 on a display (e.g., web browser 210) of client device 200.

At block 410, a user, such as individual 501, may capture one or more images (e.g., image 500, such as a "selfie" image or frame) with camera 204.

At block 412 method 400 may comprise image optimization of an image (e.g., image 500), such as updating a size, resolution, or cropping an image (e.g., image 500). In some embodiments, such optimization may involve altering an area of interest (e.g., such as areas of one or more personal attributes 502-522) by updating, changing, selecting, and/or cropping pixels or areas of the image (e.g., image 500). Such image optimization may be performed by a JavaScript script or other code or instruction as transferred from provisioning server(s) 102.

At block 420, method 400 further comprises loading, into a memory (e.g., memory 203), a machine learning imaging model (e.g., a WASM based model). This may include loading predefined imaging code 108 into memory 203 in whole or in part. As described herein, predefined imaging code 108 may comprise a WASM based module and one or more scripts. In various embodiments, such scripts may include a JavaScript file for storing, loading, and/or configuring WASM based module for operation or execution on client device 200.

Predefined imaging code 108 may be cached in the memory (e.g., memory 203) of the client device (e.g., client device 200), where the predefined imaging code 108 is allowed to access at least a portion of the memory (e.g., memory 203) as allocated for the web browser (e.g., web browser 210). As shown for FIG. 5, at least a portion of predefined imaging code 108 is cached in the memory (e.g., memory 203) of the client device (e.g., client device 200) before or during capture of the one or more images (e.g., image 500) of the individual (e.g., individual 501).

At block 422 method 400 further comprises loading, with predefined imaging code 108 into a memory (e.g., memory 203) of the client device (e.g., client device 200), one or more images (e.g., image 500) of individual 501. In various embodiments, JavaScript code or such other instructions as provided by predefined imaging code 108 may load the images. As shown in FIG. 5, the one or more images may be provided to a machine learning imaging model for image analysis.

As illustrated by FIG. 4, a WASM based module can comprise a machine learning imaging model. WASM based module may be executed by CPU 202 of client device 200 to perform image analysis of image 500. Image analysis may include training or updating machine learning imaging model based on pixel data of images (e.g., image 500) of one or more individuals (e.g., individual 501). Additionally, or alternatively, image analysis may include using a machine learning imaging model of WASM based module, as previously trained, to determine, based on the one or more images (e.g., image 500) of the individual (e.g., individual 501), one or more personal attributes of the individual (e.g., personal attributes 502-522). Pixel data of image 500 (e.g., detailing one or more features of an individual, such as a mouth, hairline, face, skin, or portion(s) thereof) may be used to train the WASM based machine learning imaging model, or cause an existing machine model, to determine one or more personal attributes of the individual. Such personal attributes may include, but are not limited to a facial feature (e.g., a skin or facial hair feature), an oral, e.g., tooth or teeth related need (e.g., plaque, coloring, or other oral issue), or a hair-based feature (e.g., hair length, hair coloring, etc.) features of the individual, for example as shown and described for image 500 of FIG. 5. The machine learning model may also be trained, and may also use, non-image or text-based data of an individual including, but not limited, demographic data (e.g., age, sex, etc.) and geolocation, humidity of an area, etc.

At block 424 method 400 further comprises determining, with predefined imaging code 108 based on image analysis of the one or more images (e.g., image 500) of the individual (e.g., 500), one or more personal attributes (e.g., personal attributes 502-522) of individual 501. For example, this may include the result of a machine learning imaging model, such as a WASM based machine learning imaging model.

In various embodiments, a machine learning imaging model may input pixel data of an image (e.g., image 500) of an individual (e.g., individual 501) as feature data. The machine learning imaging model may output, as a result at block 424, label data, that may include numeric data (e.g., age of individual 501), classification data (e.g., hair length with classification "1" or "2" of personal attribute 522 and/or eye color "green" or "blue" of persona attribute 504), or identification data (e.g., skin area of personal attribute 502). Additionally, or alternatively, the machine learning imaging model may output, as a result at block 424, label data, that may include a visualization or annotation. Such visualization or annotation may comprise an image or video image (e.g., image 500) highlighting possible areas of interest (e.g., personal attributes 502-522). In some embodiments, such visualization or annotation may be shown on display screen 201 in real-time or near real-time, with the particular areas marked or highlighted, as illustrated by the areas or portions of image 500 (e.g., personal attributes 502-522) as shown by FIG. 5. In some embodiments, such the particular areas marked or highlighted may be shown as an augmented reality (AR) image where the individual's (e.g., individual 501) face, or other body portion, is shown in real-time or near real-time with annotated markings (e.g., personal attributes 502-522) superimposed on the image 500 and viewable on display screen 201.

At block 426, method 400 further comprises displaying the result, as generated or produced by machine learning imaging model, as described for block 424, on GUI 218. Client device 200, with the predefined imaging code 108 (e.g., including scripts and or other instructions described herein), may render one or more images and related personal attributes (e.g., any one of 502-522) of individual 501 within the interactive GUI (e.g., display screen 201). As described, the one or more personal attributes 502-522 may comprise one or more facial features (e.g., skin 502, eye 504, eyebrow 506, or lips 512), one or more oral features (e.g., teeth (not shown)), or one or more hair-based features (e.g., hair 522) of individual 501. The images may be rendered as still images, video images (i.e., frames), annotated images, AR based images, or the like as described herein.

In various embodiment, the result or images as determined, or analyzed, may be displayed with, or be used to display (e.g., via display screen 201), one or more corresponding recommend products. For example, a recommended product (e.g., makeup or base) that corresponds to age, wrinkles, eye color, hair color, length of hair, etc. as determined from the pixel data of the personal attributes (e.g., personal attributes 502-522) of the individual may be displayed or otherwise recommended to the user or individual.

Figure 6:
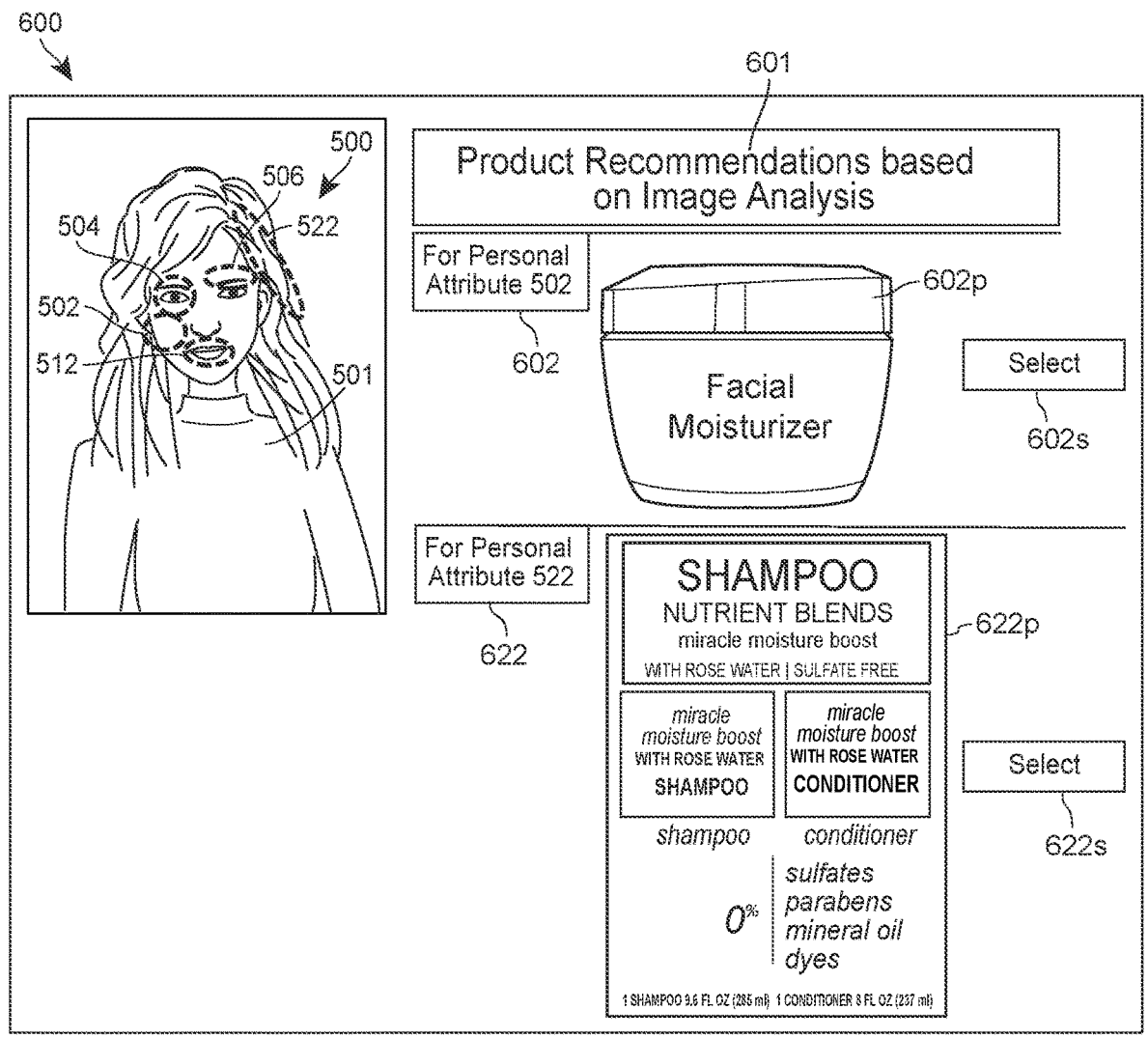
FIG. 6 illustrates an example display or user interface for recommending one or more products based on the one or more personal attributes of the individual of FIG. 5.

FIG. 6 illustrates an example display or user interface 600 for recommending one or more products (e.g., products 602*p* and 622*p*) based on the one or more personal attributes (e.g., 502 and 522) of individual 501 of FIG. 5. In the example of FIG. 6, user interface 600 may be, or may be displayed as part of, user interface 218 described herein. For example, in various embodiments, the output or result of machine learning imaging model (e.g., of and/or WASM module as described herein) may be used to generate or identify recommendations for corresponding product(s) on based on image analysis (e.g., analysis of pixel data of image 500) of the one or more personal attributes (e.g., 502 and 522) of individual 501. Such recommendations may include products such as toothpaste (e.g., for oral attributes) or how to use a particular product (e.g., how to apply a specific, recommended beauty cream). Other examples may include haircare, e.g., display of textual or video instructions of how to achieve a recommended hair grooming or a hairstyle for the user or individual using recommended products.

In the example of FIG. 6, user interface 600 comprises a list 601 of recommended products as determined by image analysis of image 500 and on the one or more personal attributes (e.g., 502 and 522) of individual 501 of FIG. 5. List 601 includes at least two products 602*p* and 622*p* that correspond, respectively, to personal attributes 502 and 522. List 601 includes a first recommendation 602 for personal attribute 502 (e.g., a skin attribute), where the recommend product 602*p* is a skin care product that may address one or more identified features (e.g., wrinkles) of individual 501 as detected by a machine learning imaging model (e.g., of predefined imaging code 108) by analysis of image 500.

Similarly, list 601 includes a second recommendation 602 for personal attribute 522 (e.g., a hair attribute), where the recommend product 622*p* is a hair care product that may address one or more identified features (e.g., split ends, dandruff, or hair shine) of individual 501 as detected by a machine learning imaging model (e.g., of predefined imaging code 108) by analysis of image 500. Other such products for the same or different personal attributes, including those as described herein, may be also be recommended in a similar manner.

User interface 600 may further include selectable UI buttons 602s and 622s to allow a user (e.g., individual 501) to select for purchase or shipment the corresponding products, e.g., 602p and 622p, respectively. In some embodiments, selection of selectable UI buttons 602s and 622s may cause the recommended product(s) to be shipped to the user (e.g., individual 501) and/or may notify a third party that the individual is interested in the product(s).

Aspects of the Disclosure

The following aspects are provided as examples in accordance with the disclosure herein and are not intended to limit the scope of the disclosure.

1. An artificial intelligence-based imaging system configured to interact with individuals via a web environment, the artificial intelligence-based imaging system comprising: a provisioning server comprising one or more processors and one or more memories, the provisioning server configured to respond to requests from a web browser executing on a client device; a predefined imaging code stored in the one or more memories of the provisioning server; and computing instructions configured to execute on the one or more processors of the provisioning server, wherein the computing instructions cause the provisioning server, upon receiving a request from the web browser, to transfer the predefined imaging code to the web browser for execution by a client processor of the client device, wherein, the predefined imaging code is configured, upon execution by the client processor, to: load, into a memory of the client device, one or more images of an individual, and determine, based on image analysis of the one or more images of the individual, one or more personal attributes of the individual, and wherein the predefined imaging code is executable within the web browser without communication with the provisioning server.

2. The artificial intelligence-based imaging system of aspect 1, where the predefined imaging code comprises a web assembly (WASM) based module and one or more scripts.

3. The artificial intelligence-based imaging system of aspect 2, wherein the WASM based module comprises a machine learning imaging model, the machine learning imaging model configured to input the one or more images of the individual and determine the personal attributes of the individual.

4. The artificial intelligence-based imaging system of aspect 3, wherein the machine learning imaging model is further configured to input non-image based data of the individual, and wherein the machine learning imaging model further determines the personal attributes of the individual based on the non-image based data.

5. The artificial intelligence-based imaging system of any one of aspects 1-4, wherein the predefined imaging code comprises a machine learning imaging model implements at least a TENSORFLOW based library.

6. The artificial intelligence-based imaging system of any one of aspects 1-5, wherein the predefined imaging code is transferred during a single transmission from the provisioning server to the web browser.

7. The artificial intelligence-based imaging system of aspect 6, wherein at least a portion of the predefined imaging code is cached in the memory of the client device before or during capture of the one or more images of the individual.

8. The artificial intelligence-based imaging system of any one of aspects 1-7, wherein the web browser is configured to receive hypertext markup language (HTML).

9. The artificial intelligence-based imaging system of any one of aspects 1-8, wherein the predefined imaging code is executable within the web browser without sending personally identifiable information (PII) to the provisioning server.

10. The artificial intelligence-based imaging system of any one of aspects 1-9, wherein the predefined imaging code is further configured, upon execution by the client processor, to: render the one or more images with the one or more personal attributes of the individual within an interactive graphical user interface (GUI) within the web browser on a display of the client device.

11. An artificial intelligence-based imaging method for interacting with individuals via a web environment, the artificial intelligence-based imaging method comprising: receiving, at a provisioning server, a request from a web browser for a predefined imaging code, the provisioning server having access to a memory storing the predefined imaging code; responding, by the provisioning server, to the request by transferring the predefined imaging code to the web browser for execution by a client processor of a client device, the web browser executing on the client device; loading, with the predefined imaging code into a memory of the client device, one or more images of an individual; and determining, with the predefined imaging code based on image analysis of the one or more images of the individual, one or more personal attributes of the individual, wherein the predefined imaging code is executable within the web browser without communication with the provisioning server.

12. The artificial intelligence-based imaging system of aspect 11, where the predefined imaging code comprises a web assembly (WASM) based module and one or more scripts 13. The artificial intelligence-based imaging system of aspect 12, wherein the WASM based module comprises a machine learning imaging model, the machine learning imaging model configured to input the one or more images of the individual and determine the personal attributes of the individual.

14. The artificial intelligence-based imaging method of aspect 13, wherein the machine learning imaging model is further configured to input non-image based data of the individual, and wherein the machine learning imaging model further determines the personal attributes of the individual based on the non-image based data.

15. The artificial intelligence-based imaging system of any one of aspects 10-14, wherein the predefined imaging code comprises a machine learning imaging model implements at least a TENSORFLOW based library.

16. The artificial intelligence-based imaging system of any one of aspects 10-15, wherein the predefined imaging code is transferred during a single transmission from the provisioning server to the web browser.

17. The artificial intelligence-based imaging system of aspect 16, wherein at least a portion of the predefined imaging code is cached in the memory of the client device before or during capture of the one or more images of the individual.

18. The artificial intelligence-based imaging system of any one of aspects 10-17, wherein the web browser is configured to receive hypertext markup language (HTML).

19. The artificial intelligence-based imaging system of any one of aspects 10-18, wherein the predefined imaging code is executable within the web browser without sending personally identifiable information (PII) to the provisioning server.

20. The artificial intelligence-based imaging system of any one of aspects 10-19, wherein the predefined imaging code is further configured, upon execution by the client processor, to: render the one or more images with the one or more personal attributes of the individual within an interactive graphical user interface (GUI) within the web browser on a display of the client device.

21. An artificial intelligence-based imaging system configured to interact with individuals via a web environment, the artificial intelligence-based imaging system comprising: a provisioning server comprising one or more processors and one or more memories, the provisioning server configured to respond to requests from a web browser executing on a client device; a predefined imaging code stored in the one or more memories of the provisioning server; and computing instructions configured to execute on the one or more processors of the provisioning server, wherein the computing instructions cause the provisioning server, upon receiving a request from the web browser, to transfer the predefined imaging code to the web browser for execution by a client processor of the client device, wherein, the predefined imaging code is configured, upon execution by the client processor, to: load, into a memory of the client device, one or more images of an individual, and determine, based on image analysis of the one or more images of the individual, one or more personal attributes of the individual, and wherein the predefined imaging code is executable within the web browser without communication with the provisioning server, and wherein the one or more personal attributes comprise one or more facial features, one or more oral features, or one or more hair-based features of the individual.

22. The artificial intelligence-based imaging system of aspect 21, wherein the predefined imaging code is further configured, upon execution by the client processor, to recommend one or more products to the individual based on the one or more personal attributes of the individual.

23. An artificial intelligence-based imaging method for interacting with individuals via a web environment, the artificial intelligence-based imaging method comprising: receiving, at a provisioning server, a request from a web browser for a predefined imaging code, the provisioning server having access to a memory storing the predefined imaging code; responding, by the provisioning server, to the request by transferring the predefined imaging code to the web browser for execution by a client processor of a client device, the web browser executing on the client device; loading, with the predefined imaging code into a memory of the client device, one or more images of an individual; and determining, with the predefined imaging code based on image analysis of the one or more images of the individual, one or more personal attributes of the individual, wherein the predefined imaging code is executable within the web browser without communication with the provisioning server, and wherein the one or more personal attributes comprise one or more facial features, one or more oral features, or one or more hair-based features of the individual.

24. The artificial intelligence-based imaging method of aspect 23, wherein the predefined imaging code is further configured, upon execution by the client processor, to recommend one or more products to the individual based on the one or more personal attributes of the individual.

25. An artificial intelligence-based imaging system configured to interact with individuals via a web environment, the artificial intelligence-based imaging system comprising: a provisioning server comprising one or more processors and one or more memories, the provisioning server configured to respond to requests from a web browser executing on a client device; a predefined code stored in the one or more memories of the provisioning server; and computing instructions configured to execute on the one or more processors of the provisioning server, wherein the computing instructions cause the provisioning server, upon receiving a request from the web browser, to transfer the predefined imaging code to the web browser for execution by a client processor of the client device, wherein the predefined code is configured, upon execution by the client processor, to: load, into a memory of the client device, one or more images or non-image based data of an individual, and determine, based on analysis of the one or more images or the non-image based data of the individual, one or more personal attributes of the individual, and wherein the predefined imaging code is executable within the web browser without communication with the provisioning server.

Additional Considerations

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An artificial intelligence based imaging system configured to interact with individuals via a web environment, the artificial intelligence based imaging system comprising:
a provisioning server comprising one or more processors and one or more memories, the provisioning server configured to respond to requests from a web browser executing on a client device;
a predefined imaging code stored in the one or more memories of the provisioning server; and
computing instructions configured to execute on the one or more processors of the provisioning server,
wherein the computing instructions cause the provisioning server, upon receiving a request from the web browser, to transfer the predefined imaging code to the web browser for execution by a client processor of the client device,
wherein, the predefined imaging code is configured, upon execution by the client processor, to:
load, into a memory of the client device, one or more images of an individual, and
determine, based on image analysis of the one or more images of the individual, one or more personal attributes of the individual, and
wherein the predefined imaging code is executable within the web browser without communication with the provisioning server.

2. The artificial intelligence based imaging system of claim 1, where the predefined imaging code comprises a web assembly (WASM) based module and one or more scripts.

3. The artificial intelligence based imaging system of claim 2, wherein the WASM based module comprises a machine learning imaging model, the machine learning imaging model configured to input the one or more images of the individual and determine the personal attributes of the individual.

4. The artificial intelligence based imaging system of claim 3, wherein the machine learning imaging model is further configured to input non-image based data of the individual, and wherein the machine learning imaging model further determines the personal attributes of the individual based on the non-image based data.

5. The artificial intelligence based imaging system of claim 1, wherein the predefined imaging code comprises a machine learning imaging model implements at least a TENSORFLOW based library.

6. The artificial intelligence based imaging system of claim 1, wherein the predefined imaging code is transferred during a single transmission from the provisioning server to the web browser.

7. The artificial intelligence based imaging system of claim 6, wherein at least a portion of the predefined imaging code is cached in the memory of the client device before or during capture of the one or more images of the individual.

8. The artificial intelligence based imaging system of claim 1, wherein the web browser is configured to receive hypertext markup language (HTML).

9. The artificial intelligence based imaging system of claim 1, wherein the predefined imaging code is executable within the web browser without sending personally identifiable information (PII) to the provisioning server.

10. The artificial intelligence based imaging system of claim 1, wherein the predefined imaging code is further configured, upon execution by the client processor, to: render the one or more images with the one or more personal attributes of the individual within an interactive graphical user interface (GUI) within the web browser on a display of the client device.

11. An artificial intelligence based imaging method for interacting with individuals via a web environment, the artificial intelligence based imaging method comprising:
receiving, at a provisioning server, a request from a web browser for a predefined imaging code, the provisioning server having access to a memory storing the predefined imaging code;
responding, by the provisioning server, to the request by transferring the predefined imaging code to the web browser for execution by a client processor of a client device, the web browser executing on the client device;
loading, with the predefined imaging code into a memory of the client device, one or more images of an individual; and
determining, with the predefined imaging code based on image analysis of the one or more images of the individual, one or more personal attributes of the individual,
wherein the predefined imaging code is executable within the web browser without communication with the provisioning server.

12. The artificial intelligence based imaging method of claim 11, where the predefined imaging code comprises a web assembly (WASM) based module and one or more scripts.

13. The artificial intelligence based imaging method of claim 12, wherein the WASM based module comprises a machine learning imaging model, the machine learning imaging model configured to input the one or more images of the individual and determine the personal attributes of the individual.

14. The artificial intelligence based imaging method of claim 13, wherein the machine learning imaging model is further configured to input non-image based data of the individual, and wherein the machine learning imaging model further determines the personal attributes of the individual based on the non-image based data.

15. The artificial intelligence based imaging method of claim 11, wherein the predefined imaging code comprises a machine learning imaging model implements at least a TENSORFLOW based library.

16. The artificial intelligence based imaging method of claim 11, wherein the predefined imaging code is transferred during a single transmission from the provisioning server to the web browser.

17. The artificial intelligence based imaging method of claim 16, wherein at least a portion of the predefined imaging code is cached in the memory of the client device before or during capture of the one or more images of the individual.

18. The artificial intelligence based imaging method of claim 11, wherein the web browser is configured to receive hypertext markup language (HTML).

19. The artificial intelligence based imaging method of claim 11, wherein the predefined imaging code is executable within the web browser without sending personally identifiable information (PII) to the provisioning server.

20. The artificial intelligence based imaging method of claim 11, wherein the predefined imaging code is further configured, upon execution by the client processor, to: render the one or more images with the one or more personal attributes of the individual within an interactive graphical user interface (GUI) within the web browser on a display of the client device.

21. An artificial intelligence based imaging system configured to interact with individuals via a web environment, the artificial intelligence based imaging system comprising:
a provisioning server comprising one or more processors and one or more memories, the provisioning server configured to respond to requests from a web browser executing on a client device;
a predefined imaging code stored in the one or more memories of the provisioning server; and
computing instructions configured to execute on the one or more processors of the provisioning server,
wherein the computing instructions cause the provisioning server, upon receiving a request from the web browser, to transfer the predefined imaging code to the web browser for execution by a client processor of the client device,
wherein, the predefined imaging code is configured, upon execution by the client processor, to:
load, into a memory of the client device, one or more images of an individual, and
determine, based on image analysis of the one or more images of the individual, one or more personal attributes of the individual, and
wherein the predefined imaging code is executable within the web browser without communication with the provisioning server, and
wherein the one or more personal attributes comprise one or more facial features, one or more oral features, or one or more hair-based features of the individual.

22. The artificial intelligence based imaging system of claim 21, wherein the predefined imaging code is further configured, upon execution by the client processor, to recommend one or more products to the individual based on the one or more personal attributes of the individual.

23. An artificial intelligence based imaging method for interacting with individuals via a web environment, the artificial intelligence based imaging method comprising:
receiving, at a provisioning server, a request from a web browser for a predefined imaging code, the provisioning server having access to a memory storing the predefined imaging code;
responding, by the provisioning server, to the request by transferring the predefined imaging code to the web browser for execution by a client processor of a client device, the web browser executing on the client device;
loading, with the predefined imaging code into a memory of the client device, one or more images of an individual; and
determining, with the predefined imaging code based on image analysis of the one or more images of the individual, one or more personal attributes of the individual,
wherein the predefined imaging code is executable within the web browser without communication with the provisioning server, and wherein the one or more personal attributes comprise one or more facial features, one or more oral features, or one or more hair-based features of the individual.

24. The artificial intelligence based imaging method of claim 23, wherein the predefined imaging code is further configured, upon execution by the client processor, to recommend one or more products to the individual based on the one or more personal attributes of the individual.

25. An artificial intelligence based imaging system configured to interact with individuals via a web environment, the artificial intelligence based imaging system comprising:
   a provisioning server comprising one or more processors and one or more memories, the provisioning server configured to respond to requests from a web browser executing on a client device;
   a predefined code stored in the one or more memories of the provisioning server; and
   computing instructions configured to execute on the one or more processors of the provisioning server,
   wherein the computing instructions cause the provisioning server, upon receiving a request from the web browser, to transfer the predefined imaging code to the web browser for execution by a client processor of the client device,
   wherein the predefined code is configured, upon execution by the client processor, to:
      load, into a memory of the client device, one or more images or non-image based data of an individual, and
      determine, based on analysis of the one or more images or the non-image based data of the individual, one or more personal attributes of the individual, and
   wherein the predefined imaging code is executable within the web browser without communication with the provisioning server.

* * * * *